（12）United States Patent
Chergui (10) Patent No.: US 10,780,519 B2
(45) Date of Patent: Sep. 22, 2020

(54) INTEGRATED RESISTANCE WELDING OF FUNCTIONAL ELEMENT AND AUXILIARY ELEMENT

(71) Applicant: THYSSENKRUPP STEEL EUROPE AG, Duisburg (DE)

(72) Inventor: Azeddine Chergui, Dortmund (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 1006 days.

(21) Appl. No.: 14/825,155

(22) Filed: Aug. 12, 2015

(65) Prior Publication Data

US 2016/0045977 A1 Feb. 18, 2016

(30) Foreign Application Priority Data

Aug. 12, 2014 (DE) .................. 10 2014 111 502

(51) Int. Cl.
| | |
|---|---|
| *B23K 11/16* | (2006.01) |
| *B23K 11/00* | (2006.01) |
| *B23K 11/11* | (2006.01) |
| *B23K 11/14* | (2006.01) |
| *B23K 103/16* | (2006.01) |

(52) U.S. Cl.
CPC ............ *B23K 11/16* (2013.01); *B23K 11/004* (2013.01); *B23K 11/115* (2013.01); *B23K 11/14* (2013.01); *B23K 2103/172* (2018.08)

(58) Field of Classification Search
CPC ......... B23K 11/11; B23K 11/14; B23K 11/16; B23K 11/004; B23K 11/115; B23K 2103/172

USPC ................................................ 219/91.21, 93
See application file for complete search history.

(56) References Cited

U.S. PATENT DOCUMENTS

| 5,866,868 A | 2/1999 | Hirane |
| 2007/0272660 A1* | 11/2007 | Wang ................. B23K 11/0053 |
| | | 219/93 |

(Continued)

FOREIGN PATENT DOCUMENTS

| DE | 102011100495 A1 | 11/2012 |
| DE | 102012106521 A1 | 1/2014 |

(Continued)

OTHER PUBLICATIONS

English language Abstract for JPS61115687A listed above.

(Continued)

*Primary Examiner* — Tu B Hoang
*Assistant Examiner* — Alba T Rosario-Aponte
(74) *Attorney, Agent, or Firm* — Avant Law Group, LLC (57) ABSTRACT

The invention relates to a method for joining at least one sandwich sheet to at least one functional element made of metal, wherein the at least one sandwich sheet has two metallic outer layers and a thermoplastic layer arranged between the metallic outer layers, wherein at least the region to be joined of the at least one sandwich sheet is heated in such a manner that the thermoplastic layer softens, the plastic layer is pushed out of the joining region by the outer layers being pressed together, and the outer layers of the at least one sandwich sheet are joined, in particular welded, to the functional element by an electric current flow between a first and a second electrode.

9 Claims, 4 Drawing Sheets

(56) References Cited

U.S. PATENT DOCUMENTS

| | | | | |
|---|---|---|---|---|
| 2011/0188927 | A1* | 8/2011 | Mizrahi | B23K 11/115 |
| | | | | 403/271 |
| 2014/0224774 | A1 | 8/2014 | Chergui et al. | |
| 2015/0258624 | A1* | 9/2015 | Draht | B23K 11/0053 |
| | | | | 403/267 |

FOREIGN PATENT DOCUMENTS

| | | | | |
|---|---|---|---|---|
| JP | 57094478 | A * | 6/1982 | |
| JP | 57187185 | A * | 11/1982 | B23K 11/163 |
| JP | S61115687 | A | 6/1986 | |
| JP | S62275584 | A | 11/1987 | |
| JP | S63132782 | A | 6/1988 | |
| JP | 02142681 | A * | 5/1990 | |
| WO | WO 2012150144 | A1 * | 11/2012 | B23K 11/002 |

OTHER PUBLICATIONS

English language Abstract for JPS62275584A listed above.
English language Abstract for JPS63132782A listed above.
English Abstract of DE 102012106521 (A1).

* cited by examiner

INTEGRATED RESISTANCE WELDING OF FUNCTIONAL ELEMENT AND AUXILIARY ELEMENT

CROSS-REFERENCE TO RELATED APPLICATIONS

This application claims priority to German Patent Application Serial No. DE 102014111502.3 filed Aug. 12, 2014, the entire contents of which is hereby incorporated by reference herein.

FIELD

This disclosure relates to a method and apparatus for joining at least one sandwich sheet to at least one functional element made of metal, wherein the at least one sandwich sheet has two metallic outer layers and a thermoplastic layer arranged between the metallic outer layers.

BACKGROUND

The increasing demand for lightweight construction concepts in the motor vehicle sphere moves the use of sandwich sheets which have a thermoplastic layer between two metallic, thin outer layers into the foreground in order to obtain further weight reductions in motor vehicle manufacturing by using the sandwich sheets. Sandwich sheets can supply various exclusive properties which open up new weight-saving potentials. Sandwich sheets thus have a significantly lower weight as solid sheets because of the plastic layer and at the same time provide high strength values. Furthermore, the sandwich sheets are sound-damping and provide a high level of rigidity. However, a disadvantage of sandwich sheets is that they have an electrically insulating plastic layer which causes problems with regard to the formation of a satisfactory welded joint in the case of fusion welding processes, in particular in resistance welding. Due to the problems in the case of fusion welding of sandwich sheets, the latter are currently generally adhesively bonded to other metallic components or are connected to one another mechanically, for example by beading.

Furthermore, sandwich sheets are intended to provide further functions which are supplied by means of functional elements, for example bolts, threaded bolts, welding nuts or similar functional elements. For this purpose, the functional elements have to be connected to the sandwich sheet. German laid-open application DE 10 2012 106 521 A1 discloses a method for joining sandwich sheets to additional joining parts, for example welding bolts, wherein the welding bolt has a protruding welding protrusion at the end directed towards the sandwich sheet, and a sheet-like auxiliary element. The bolt was connected beforehand to the auxiliary element, which has the welding protrusion, and then the two together are joined to the sandwich sheet. In order to increase the force-absorbing capability of a functional element welded onto a sandwich sheet, the auxiliary element is of sheet-like design. However, two working steps are necessary for this purpose. Welding of bolt and auxiliary element in a first operation and then positioning and welding the bolt and the auxiliary element to the sandwich sheet.

SUMMARY

In one aspect of the present disclosure, a method and apparatus are disclosed for joining at least one sandwich sheet to at least one functional element made of metal, wherein the at least one sandwich sheet has two metallic outer layers and a thermoplastic layer arranged between the metallic outer layers, wherein at least the region to be joined of the at least one sandwich sheet is heated in such a manner that the thermoplastic layer softens, the plastic layer is pushed out of the joining region by the outer layers being pressed together, and the outer layers of the at least one sandwich sheet are joined, in particular welded, to the functional element by an electric current flow between a first and a second electrode. The teachings of the present disclosure simplify and more cost-effectively enable the joining of functional elements to sandwich sheets.

BRIEF DESCRIPTION OF THE DRAWINGS

The present invention is described in detail below with reference to the attached drawing figures, wherein.

DETAILED DESCRIPTION

According to a first teaching of the present disclosure, in a single operation, the at least one functional element is joined to a first auxiliary element and then the functional element is joined together with the auxiliary element to the at least one sandwich sheet.

It has turned out that the two joining steps, connecting the functional element to an auxiliary element and connecting the functional element together with the auxiliary element to the sandwich sheet can be carried out in a single operation directly on the sandwich sheet. By this means, the step of producing the functional elements with the auxiliary element joined thereon is saved and therefore the entire method is significantly simplified.

According to a first refinement of the present invention, the at least one functional element is positioned together with the first auxiliary element in a first receptacle on one side of the sandwich sheet, wherein the first receptacle together with the at least one functional element and the first auxiliary element form components of a first current path through which at least a first joining current flows during the joining of the at least one functional element to the auxiliary element, wherein a force is exerted at the same time on the functional element such that the functional element and the first auxiliary element are joined to each other, the at least one functional element with the joined first auxiliary element, the first receptacle and a second electrode subsequently form components of a second current path through which the preheating current for heating the sandwich sheet flows when the first current path is open, and after the outer sheets of the sandwich sheet are pressed together, a second joining current flows from the first electrode through the functional element, the first auxiliary element and the pressed-together outer sheets of the sandwich sheet to the second electrode. By means of the formation of the two current paths, the process of joining the functional element, for example a threaded bolt, to the auxiliary element can take place directly on the sandwich sheet in a first receptacle, wherein the receptacle receives both the functional element itself and the auxiliary element. At the same time, preheating of the sandwich sheet via the second current path can be ensured, and therefore the plastic layer can be pushed out of the joining region of the sandwich sheet and the two outer sheets can be brought into contact with each other. As soon as the outer sheets enter into contact, the joining current for joining the functional element together with the first auxiliary element to the sandwich sheet can take place, and therefore a very simple process sequence is ensured.

Preferably, according to a further refinement, when the first and second current paths are open, the joining current for joining purposes flows through the functional element, the first auxiliary element and the outer sheets of the at least one sandwich sheet to the second electrode. By this means, in principle, a shunt via the second current path can be excluded. Secondly, it is also conceivable that, by means of an increased resistance in the second current path upon contact of the outer sheets, the electrical resistance between the first electrode and the second electrode, taking into account the current path via the two outer sheets which are in contact, is at such a low level that a significant current no longer flows via the second current path. In this case, for example, means for closing and opening the second current path can be dispensed with.

According to a further refinement of the method, at least one second auxiliary element is positioned on the other side of the at least one sandwich sheet opposite the functional element and the first auxiliary element, preferably in a second receptacle, wherein the joining current essentially flows through the second auxiliary element to the second electrode during the joining of the functional element and of the first auxiliary element to the sandwich sheet. By means of a second auxiliary element which is supplied, for example, in the form of a patch-like sheet, there is firstly the possibility of further increasing the stability of the welded functional elements if the second auxiliary element is likewise joined to the sandwich sheet. Furthermore, the second auxiliary element can contribute during the joining process to stabilizing the sandwich sheet in the region in which the functional element is joined.

According to a further refinement of the method, the first and/or the second auxiliary element provide/provides an at least partially sheet-like contact with the sandwich sheet, wherein the first and/or the second auxiliary element are/is used during the joining to the sandwich sheet in order to push the plastic layer between the outer sheets of the at least one sandwich sheet. Firstly, by means of the sheet-like contact of the first and/or second auxiliary element, gentle heating of the sandwich sheet in the region to be joined can be ensured, and, secondly, there is the possibility, with the sheet-like contact, to ensure a greater force absorption capability of the functional elements after the welding. A sheet-like contact is understood here as meaning a contact surface which has a larger contact surface than the contact surface of the pure functional element, preferably a possible contact surface which is at least four times larger than the sandwich sheet.

According to a further embodiment of the method, the first and/or second auxiliary element have/has at least one welding protrusion protruding in the direction of the sandwich sheet, wherein a joining current is introduced via the welding protrusion present in the first and/or second auxiliary element into the sandwich sheet such that the first and/or second auxiliary element are/is joined to the sandwich sheet at least via the at least one welding protrusion. By means of the protruding welding protrusions, there is the possibility of increasing the current densities and therefore locally intensifying the heating at the protruding welding protrusions such that, first of all, the sandwich sheet material entering into contact with the welding protrusion will soften first.

Preferably, at least two sandwich sheets arranged one above the other are joined to the functional element and to the first auxiliary element. By means of the total of four outer sheets which are involved at the joining position, the force absorption capacity of a correspondingly arranged functional element can be increased once again. At the same time, there is the possibility of connecting two sandwich sheets to each other via the functional element.

According to a further refinement of the method, the second auxiliary element is designed as a sacrificial element and is not connected to the sandwich sheet in an integrally bonded manner during the joining of the functional element and of the first auxiliary element to the at least one sandwich sheet. The sacrificial element serves merely to improve the joining conditions with regard to the joining of the functional element to the auxiliary element and to the sandwich sheet, for example by supporting the corresponding welding position or by a sheet-like heating of the sandwich sheet, without itself becoming part of the sandwich sheet or of the connected functional element.

According to a further embodiment, the second auxiliary element is positioned in a second receptacle opposite the first auxiliary element, wherein the second receptacle forms a component of the second current path, at least when the first current path is open, and, before the actual joining of the functional element and of the first auxiliary element to the sandwich sheet when the second current path is closed, a preheating current flows in the second current path via the receptacle through the auxiliary element to the second electrode. By means of the use of a second receptacle for positioning the second auxiliary element, a further simplification of the positioning of the auxiliary element and the contact connection thereof in order to form a component of the second current path is significantly facilitated. Via the preheating current flowing through the second current path, the region to be joined of the sandwich sheet can be heated in a controlled manner via the second auxiliary element and, for example, also via the second receptacle, force can be exerted on the second auxiliary element in such a manner that the second auxiliary element presses the outer sheets of the sandwich sheet together and pushes the plastic layer located in-between.

In this respect, it is also advantageous if, according to a further refinement of the method, the first receptacle and the second receptacle are assigned to a joining apparatus which simultaneously positions the two receptacles at a joining position before the joining operation, wherein a force is also exerted on the sandwich sheet via the joining apparatus during the joining operation, in order to push the plastic layer between the outer layers in the region of the functional element to be joined. For example, the first and the second receptacle can be part of welding tongs which are automatically filled again with functional elements and auxiliary elements after joining has taken place and can subsequently move to the next joining position.

Preferably, bolts, threaded bolts or welding nuts are joined as the functional elements to the sandwich sheet. These typical functional elements permit sandwich sheet to be screwed to other parts, for example via the integrated threaded bolt. However, other functional elements are also conceivable.

According to a second teaching of the present invention, the object indicated is also achieved by an apparatus for joining at least one functional element and an auxiliary element to a sandwich sheet, which apparatus has a first receptacle for receiving and positioning the functional element and the first auxiliary element, wherein means for exerting a force from the functional element onto the auxiliary element and the sandwich sheet, and means for supplying a first and a second electric current path are provided, wherein, with the first electric current path, an electric current flow from the functional element into the auxiliary element can be supplied in order to join functional element and auxiliary element, with the second current path, a preheating current flow for preheating the sandwich sheet can be supplied, and means for closing and opening the first current path, preferably both current paths, are provided.

As already explained previously, the apparatus having the apparatus features mentioned makes it possible to integrate the joining process of the functional element to the first auxiliary element together with the joining process for joining the functional element and the first auxiliary element to the sandwich sheet in a single operation. The functional element and the necessary auxiliary element therefore merely have to be supplied to a corresponding apparatus such that a separate working step for supplying the functional element with auxiliary element joined thereto is saved.

According to a further refinement of the apparatus, a second receptacle for positioning a second auxiliary element and a second electrode on the other side of the at least one sandwich sheet opposite the functional element and the first auxiliary element is provided, wherein the receptacle together with the second auxiliary element forms a component of the second current path. When a second receptacle for positioning a second auxiliary element is used, the latter can be positioned particularly easily opposite the functional element and the first auxiliary element. At the same time, the receptacle makes it possible for the electric contacts not to have to be provided with a second auxiliary element, and therefore the second auxiliary element can likewise be welded to the sandwich sheet and leads to an increased force absorption capability of the functional element which is likewise joined.

According to a further refinement of the apparatus, the first receptacle and the second receptacle are part of a joining apparatus which can position the two receptacles together at a joining position. A particularly simple joining apparatus is, for example, welding tongs which include the two receptacles. The joining apparatus, for example the welding tongs, can be positioned at the necessary welding positions in a simple manner by a robot or a gantry system in order automatically to connect the functional elements to the sandwich sheet.

Figure 1:
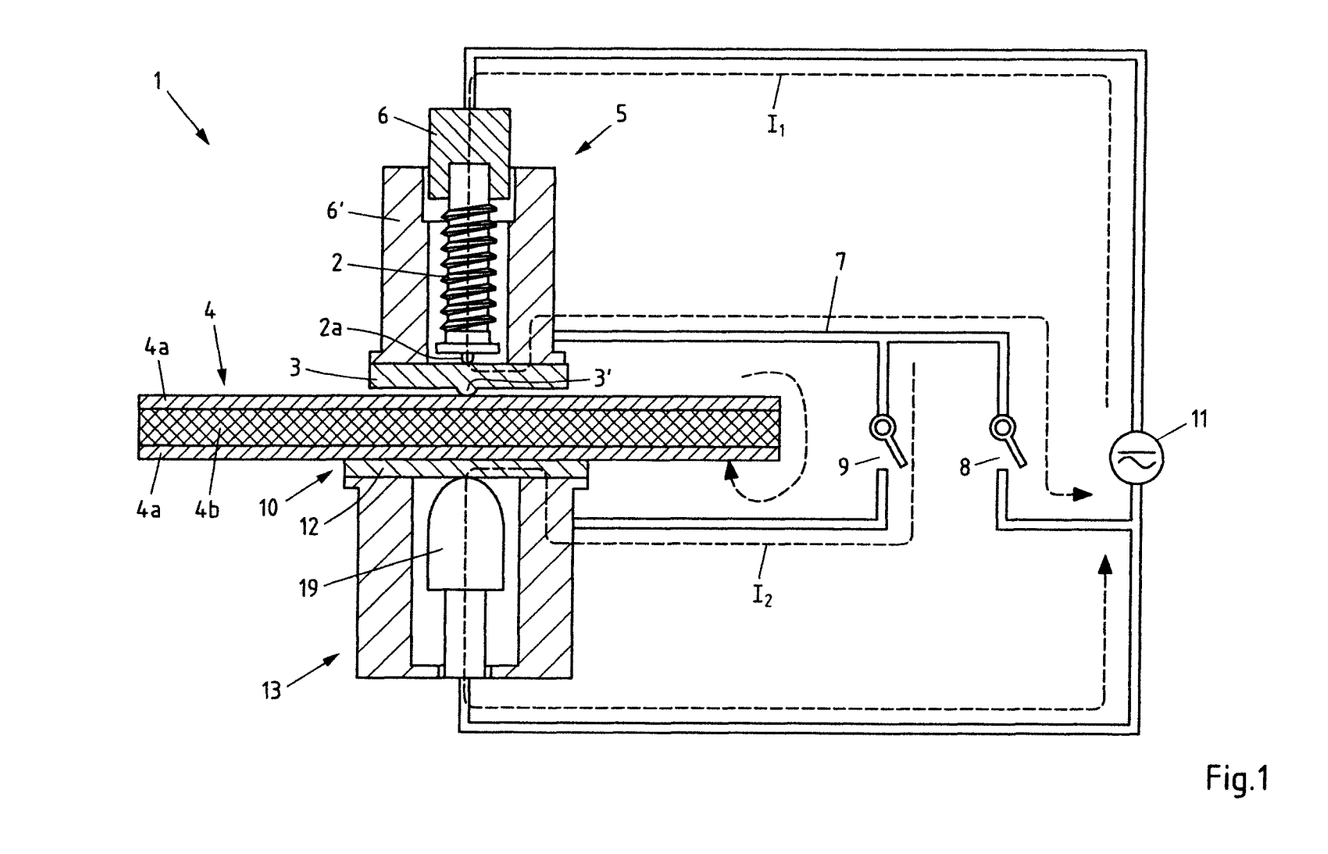
FIG. 1 is a side cross section view of a schematic embodiment of an apparatus for carrying out the method disclosed herein.

FIG. 1 shows an apparatus 1 for joining functional elements 2 to an auxiliary element 3 and to a sandwich sheet 4. The sandwich sheet 4 consists of two outer layers 4a and a plastic layer 4b located in-between. Furthermore, a first receptacle 5 for receiving and positioning the functional element 2, in the form of a threaded bolt and the first auxiliary element 3, is illustrated. However, the receptacle is only illustrated highly schematically. A force can be exerted by the functional element 2 on the auxiliary element 3 and therefore on the sandwich sheet via the first electrode 6 and means 6'. Also provided are means 7, 8, such as electrical wires, which supply a first current path, with which a joining current can be impressed between the functional element 2 and the auxiliary element 3. The joining current $I_1$ leads to the current densities at the provided welding protrusion 2a at the contact point between threaded bolt 2 and the auxiliary element 3, which is embodied as a patch, being of such a high level that the welding protrusion and the auxiliary element 3 melt at this point. By the functional element 2 being applied to the auxiliary element 3 by force by means of the electrode 6, the auxiliary element is joined to the functional element 2.

The first auxiliary element 3, for its part, has a welding protrusion 3'. If the functional element 2, the threaded bolt 2, is then joined to the auxiliary element 3 in an integrally bonded manner, the first current path can be opened, and therefore current no longer flows. Furthermore, the apparatus illustrated in FIG. 1 supplies a second current path through which the current $I_2$ which serves for preheating the sandwich sheet 4 flows. Via the means 8, 9, such as switches, for closing and opening at least the first current path, either the joining current $I_1$ for joining the functional element 2 to the auxiliary element 3 or the preheating current $I_2$ for preheating the region 10 to be joined of the sandwich sheet 4 can be set depending on the respective operation. If, after the preheating, the outer sheets 4a are brought into contact by force being applied, and the plastic layer 4b is pushed out of the joining region 10, the second current path, for example, can be opened via the means 9 such that the entire available current is introduced via the functional element 2, the auxiliary element 3 and the welding protrusion 3' thereof into the sandwich sheet or into the connected outer sheets.

As a result, the critical temperature is rapidly exceeded in particular in the region of the welding protrusion 3', and therefore the outer sheets of the sandwich sheet and the welding protrusion 3' of the auxiliary element 3 melt in this region. The functional element 2 together with auxiliary element 3 can subsequently be used as the first electrode and can be joined to the outer sheets, which are in contact, of the sandwich sheet. For this purpose, the current source 11 is available for supplying the various currents or voltages.

The second auxiliary element 12, which is preferably positioned with a second receptacle 13 on the opposite side of the sandwich sheet, ensures a sheet-like heating of the sandwich sheet such that formation of bubbles because of rapid evaporation of the plastic is opposed. Force can likewise be exerted on the sandwich sheet via the second receptacle 13, and therefore the outer sheets 4a of the sandwich sheet can be brought into contact in the joining region 10. The second electrode 19 serves for completing the current circuit and for recirculating the preheating current or else the joining current between functional element, first auxiliary element 3, sandwich sheet 4 and second auxiliary element 12.

Figure 2:
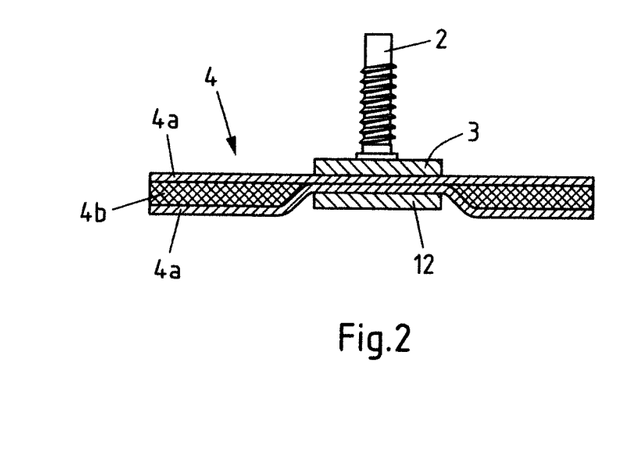
FIGS. 2 and 3 are side cross section views of a schematic embodiment of a functional element that has been welded to a sandwich sheet as disclosed herein.
Figure 3:
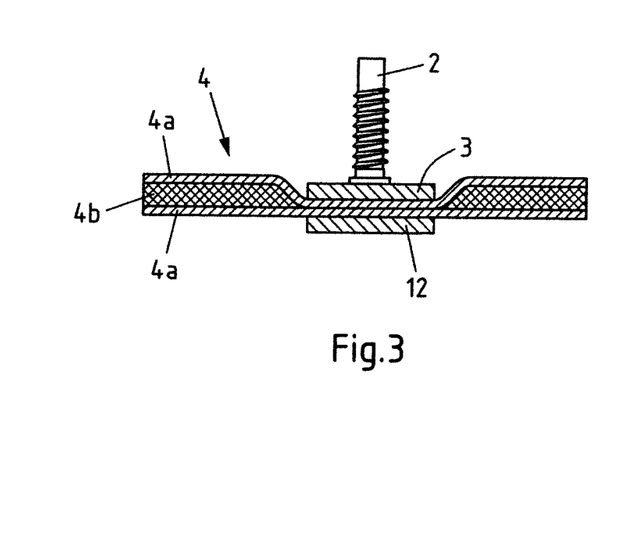

FIGS. 2 and 3 illustrate, in schematic sectional views, functional elements 2, which are joined to a sandwich sheet 4, in two different embodiments. Of course, it is also conceivable, when bringing together the outer sheets 4a of the sandwich sheet, to carry this out from both sides such that the outer sheets 4a which are in contact come into contact approximately centrally with respect to the thickness of the sandwich sheet.

Figure 4:
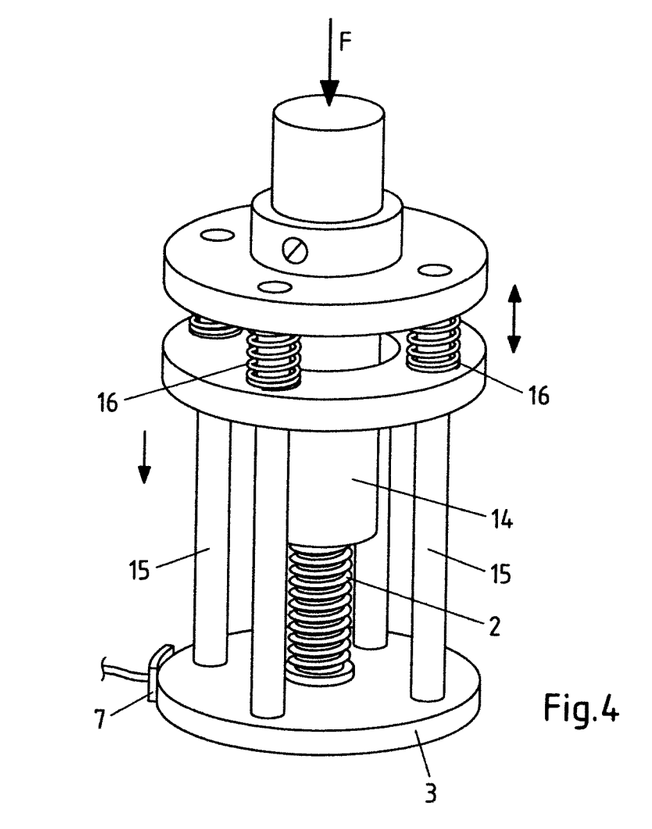
FIG. 4 is a isometric view of an embodiment of a receptacle for receiving a functional element and a first auxiliary element, as disclosed herein.

FIG. 4 schematically illustrates, perspectively, a receptacle for a functional element 2 and a first auxiliary element 3. The receptacle 5 comprises a holder for a functional element 14, which holder can receive the functional element 2. Furthermore, positioning means 15 in the form of pins are provided via which the auxiliary element 3 can be positioned exactly in relation to the functional element 2. The auxiliary element 3 which is arranged on the pins 15 is then positioned with the functional element 2 on a sandwich sheet in the region 10 to be joined, and a force F is exerted on the holder of the functional element 2. If, in the process, a joining current flows through the holder 14 via the functional element 2 to the auxiliary element 3, which joining current is transmitted by the electrical contact 7, the functional element 2 can be joined to the holding element 3. By means of the exertion of force and the spring-elastic elements 16, the relative position of the functional element 2 with respect to the auxiliary element 3 can be changed during the joining of the two elements and at the same time a force can be exerted on the functional element 2. After the joining operation or during the joining operation, it is possible, for example, for the spring-elastic elements 16 to be compressed such that a force is also exerted via the pins 15 on the auxiliary element 3 and therefore on the sandwich sheet 4. With this receptacle, the outer sheets can also be pressed together in a manner similar to the configuration from FIG. 3. As can be seen in FIG. 4, but also in FIG. 1, the auxiliary elements 3 and 12 each produce a sheet-like contact with the sandwich sheet and permit gentle heating to the melting point and at the same time, by heating and application of force, permit the plastic to be pushed out of the region 10 to be joined without the plastic evaporating and the sandwich sheet delaminating in this region.

Figure 5:
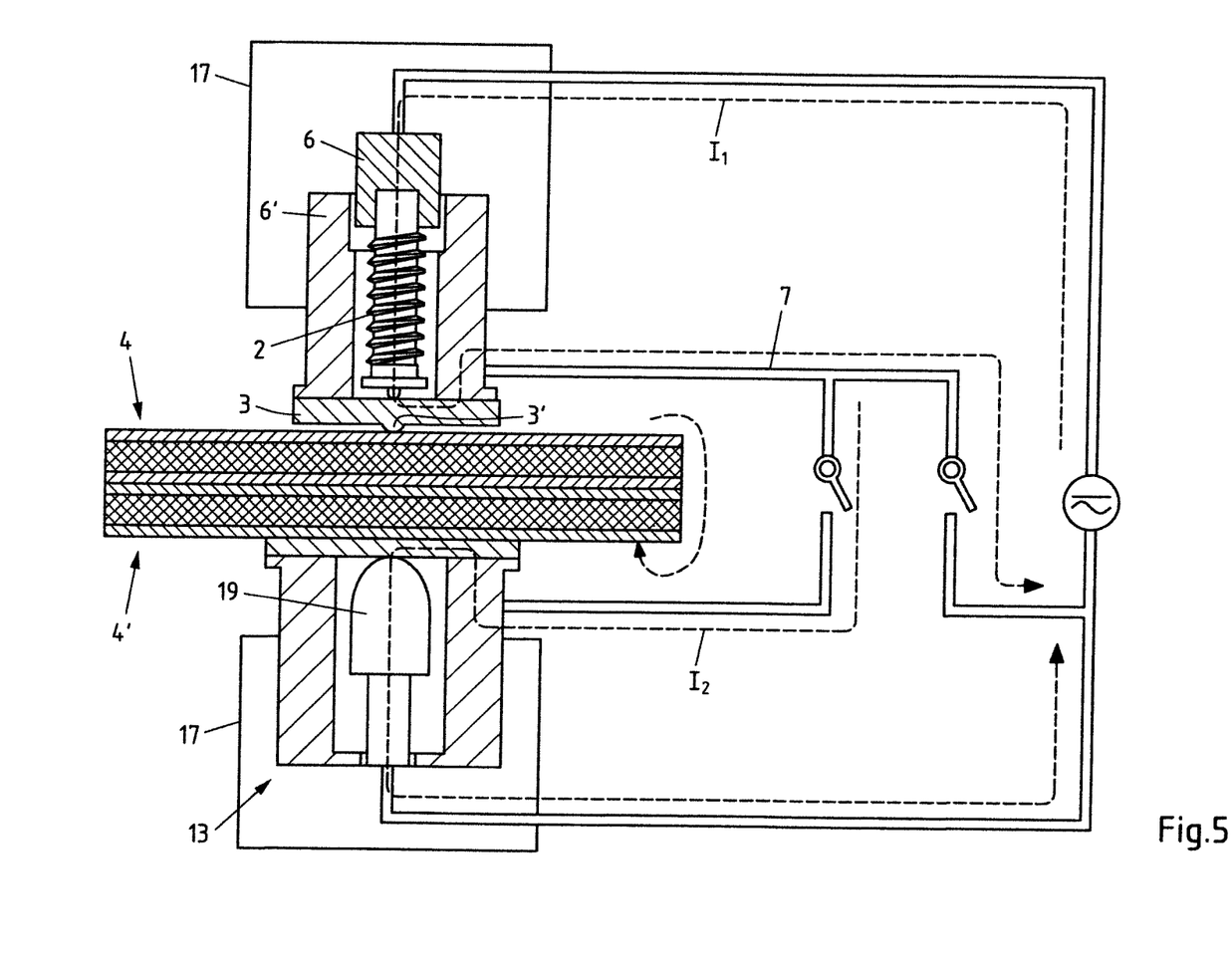
FIG. 5 is a side cross section view of the apparatus of FIG. 1 during the process of joining two sandwich sheets to a functional element, as disclosed herein.

The exemplary embodiment illustrated in FIG. 5 illustrates two sandwich sheets 4 and 4' which are intended to be joined to a functional element by the apparatus 1 according to the invention from FIG. 1. It is additionally indicated here in FIG. 5 that the first and the second receptacle 5, 13 are part of a joining apparatus 17 which is designed, for example, as welding tongs and can position the two receptacles simultaneously at a joining position before the joining operation. In addition, the joining apparatus 17 can serve to exert a force on the sandwich sheet in order to push the plastic layer between the outer layers in the region to be joined.

Figure 6:
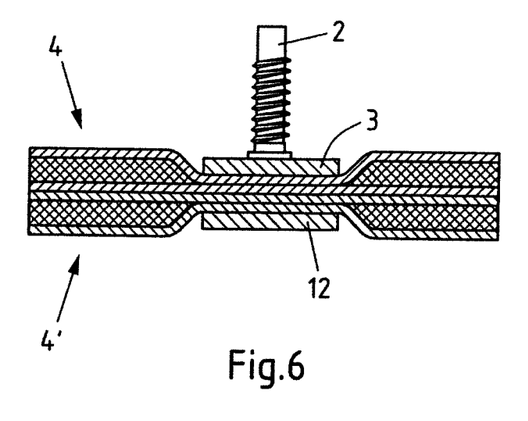
FIGS. 6 and 7 are side cross section views of a schematic embodiment of a functional element joined to two sandwich sheets, as disclosed herein.
Figure 7:
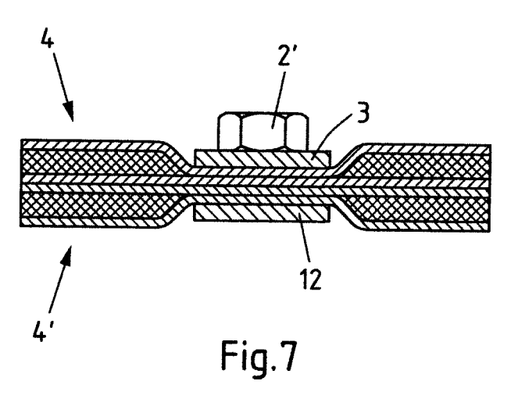

FIGS. 6 and 7 show sandwich sheets 4 and 4' which are joined alongside and which have been joined via a functional element 2 together with auxiliary element 3 and 12. A further functional element 2' is illustrated in FIG. 7, in the form of a welding nut. The auxiliary elements 3 and 12 also serve here for improving the welding process and for gently heating the plastic layer between the outer layers 4a of the sandwich sheet 4 or 4'.

Figure 8:
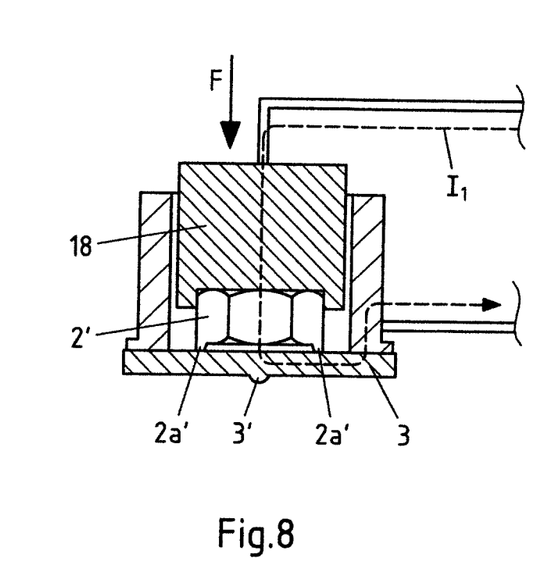
FIG. 8 is a side cross section view of an embodiment of a receptacle for welding nuts as the functional element.

FIG. 8 schematically illustrates an alternative receptacle for a functional element 2' and an auxiliary element 3. The functional element 2' has two welding protrusions 2a' via which the current $I_1$ flows from the functional element 2' into the auxiliary element 3. At the same time, means 18 with which a force can be exerted on the functional element 2' in the direction of the auxiliary element 3 are indicated. If a joining current $I_1$ flows through the functional element 2' via the welding protrusions 2a' into the auxiliary element 3, the melting point is relatively rapidly exceeded, preferably in the region of the welding protrusions, and therefore a first joining process takes place between functional element 2' and the auxiliary element 3. Subsequently, as already explained, the preheating current $I_2$ can be switched on in order, by application of force, to remove the plastic from the region to be joined in the sandwich sheet. This is not illustrated in FIG. 8. Finally, FIG. 8 also illustrates the welding protrusion 3' of the auxiliary element 3, via which an initial joining process can be achieved by intensely heating said welding protrusions.

What is claimed is:

1. A method for welding at least one sandwich sheet to at least one functional element made of metal, wherein the at least one sandwich sheet has two metallic outer layers and a thermoplastic layer disposed between the metallic outer layers, the method comprising:
   (a) welding the at least one functional element to a first auxiliary element by:
      (a1) positioning the at least one functional element together with the first auxiliary element in a first receptacle on one side of the sandwich sheet such that the at least one functional element is in contact with the first auxiliary element;
      (a2) applying a force from the functional element onto the first auxiliary element;
      (a3) applying a first welding joining current ($I_1$) through a first current path formed in part by a current source, a first electrode, the first receptacle, the at least one functional element, a welding protrusion of the at least one functional element, a first switch, and the first auxiliary element, wherein the first switch is positioned between the first auxiliary element and the current source in the first current path;
   (b) heating at least a region to be welded of the at least one sandwich sheet such that the thermoplastic layer softens by applying a preheating current ($I_2$) through a second current path formed in part by the current source, the first electrode, the first receptacle, the welded functional and auxiliary elements including the welding protrusion, a second auxiliary element, a second switch, and a second electrode, wherein the second switch is positioned between the first auxiliary element and the second auxiliary element in the second current path;
   (c) pressing the metallic outer layers together at a welding region so as to push the thermoplastic layer disposed there between out of the welding region and bring each outer metallic layer in contact with each other;
   (d) in the same operation as step (a), welding the outer metallic layers of the at least one sandwich sheet to the welded functional and first auxiliary elements, by application of an electric current flow from a first to a second electrode, the current flow passing through each of the metallic outer layers and the welded functional and first auxiliary elements;
   (e) after step (c), sending a second joining welding current through a current path formed in part by the first electrode, the first receptacle, the functional element, the welding protrusion of the functional element, the joined first auxiliary element, a welding protrusion of the jointed first auxiliary element, the pressed-together outer metallic layers of the sandwich sheet, the second auxiliary element, and the second electrode, so as to weld the first auxiliary element to the pressed together outer metallic layers,
   wherein:
      the first switch is closed and the second switch is open when applying the first welding joining current;
      the first switch is open and the second switch is closed when applying the preheating current; and
      both the first switch and the second switch are open when sending the second joining welding current.

2. The method of claim 1, wherein when the first and second current paths are open, the second joining welding current flows through each of the functional element, the first auxiliary element, and the outer metallic layers of the at least one sandwich sheet to the second electrode.

3. The method of claim 1, wherein the second auxiliary element is positioned in a second receptacle on the other side of the at least one sandwich sheet opposite the functional element and the first auxiliary element, and the second joining welding current flows through the second auxiliary element to the second electrode during the welding of the functional element and of the first auxiliary element to the sandwich sheet.

4. The method of claim 3, wherein at least one of the first and the second auxiliary elements provide an at least partially sheet-like contact with the sandwich sheet, and at least one of the first and the second auxiliary elements are used during the welding to the sandwich sheet in order to push the thermoplastic layer between the outer metallic layers of the at least one sandwich sheet.

5. The method of claim 1, wherein at least two sandwich sheets arranged one above the other are welded to the functional element and to the first auxiliary element.

6. The method of claim 3, wherein the second auxiliary element is designed as a sacrificial element and is not connected to the sandwich sheet in an integrally bonded manner during the welding of the functional element and the first auxiliary element to the at least one sandwich sheet with the first welding joining current.

7. The method of claim 3, wherein the second auxiliary element is positioned in the second receptacle opposite the first auxiliary element, wherein the second receptacle forms a component of the second current path, at least when the first current path is open, and a preheating current flows in the second current path via the receptacle through the second auxiliary element to the second electrode during the welding of the functional element and of the first auxiliary element to the sandwich sheet.

8. The method of claim 3, wherein the first receptacle and the second receptacle are assigned to a joining apparatus which simultaneously positions the two receptacles at a joining position before the welding operation, wherein a force is also exerted on the sandwich sheet via the joining apparatus during the welding operation, in order to push the thermoplastic layer between the outer layers in the region of the functional element to be welded.

9. The method of claim 3, wherein a bolt, a threaded bolt or a welding nut are welded as the functional element to the sandwich sheet.

* * * * *